United States Patent

Inagaki et al.

[11] Patent Number: 5,808,775
[45] Date of Patent: Sep. 15, 1998

[54] LASER BEAM SCANNING OPTICAL APPARATUS

[75] Inventors: Yoshihiro Inagaki, Toyokawa; Nobuo Kanai, Toyohashi; Jun Kohsaka, Toyokawa; Kenji Takeshita, Aichi-Ken; Keiji Ogoh; Hidenari Tachibe, both of Toyokawa, all of Japan

[73] Assignee: Minolta Co., Ltd., Osaka, Japan

[21] Appl. No.: 814,217

[22] Filed: Mar. 11, 1997

[30] Foreign Application Priority Data

Mar. 13, 1996 [JP] Japan .................................... 8-056373

[51] Int. Cl.$^6$ ...................................................... G02B 26/08
[52] U.S. Cl. .......................... 359/212; 359/205; 359/216
[58] Field of Search ..................................... 359/196–226, 359/641, 652, 654, 655, 662, 708, 710, 721; 347/256–261

[56] References Cited

U.S. PATENT DOCUMENTS

| | | |
|---|---|---|
| 4,720,168 | 1/1988 | Kaneko . |
| 5,155,616 | 10/1992 | Yamaguchi et al. . |
| 5,565,668 | 10/1996 | Reddersen et al. ...................... 359/204 |
| 5,610,758 | 3/1997 | Sumi ........................................ 359/207 |

*Primary Examiner*—James Phan
*Attorney, Agent, or Firm*—Price, Gess & Ubell

[57] ABSTRACT

A laser beam scanning optical apparatus which has a laser source unit, a collimator lens, a cylindrical lens, a polygon mirror and a scanning lens with an fθ function. The collimator lens is a bifocal lens, and because of the bifocal collimator lens, a part of the laser beam is focused on a point before the surface of a photosensitive member, and another part of the laser beam is focused on a point after the surface of the photosensitive member. Also, the cylindrical lens can be a bifocal lens. In this case, even when the magnification ratio in the sub scanning direction is designed small, the focal length of the cylindrical lens does not have to be lengthened.

10 Claims, 17 Drawing Sheets

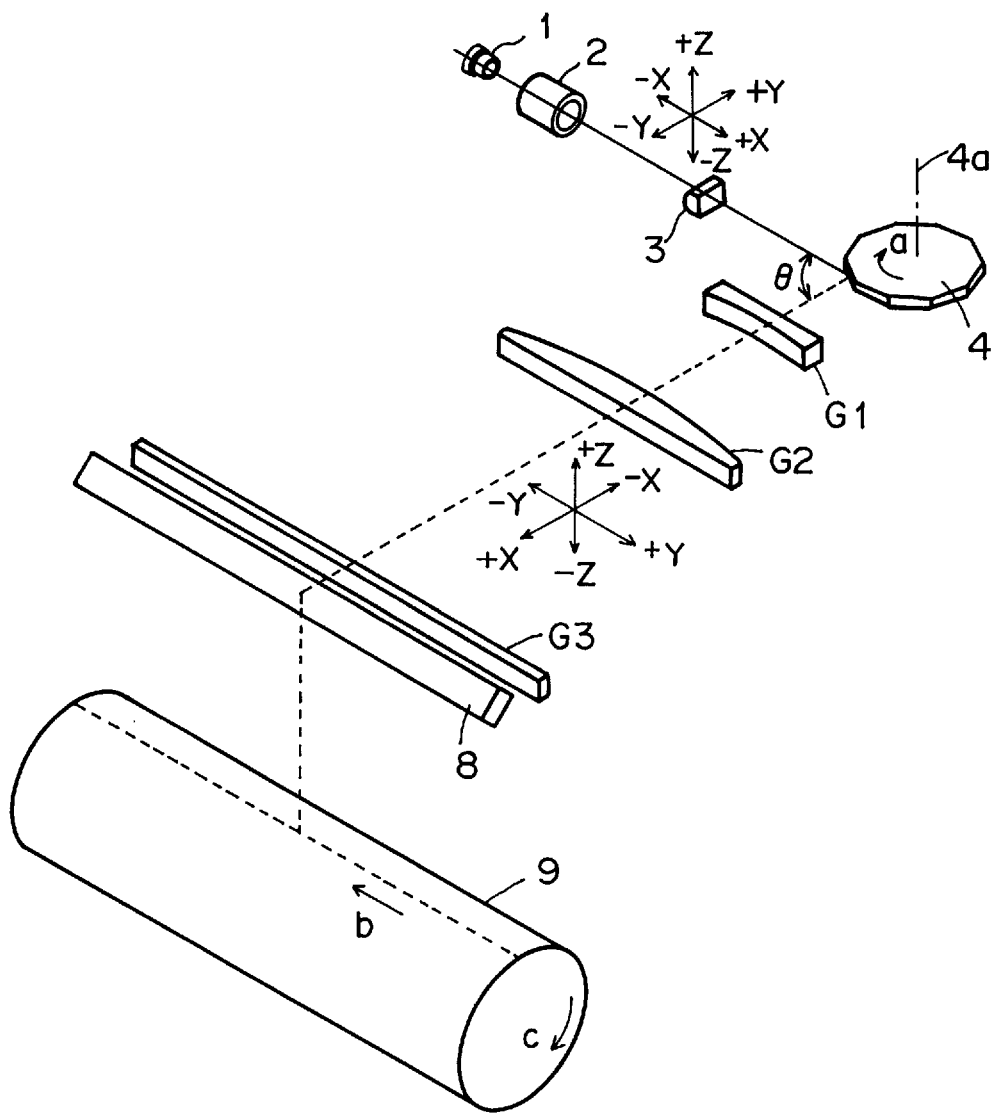
F I G. 1

F I G. 2
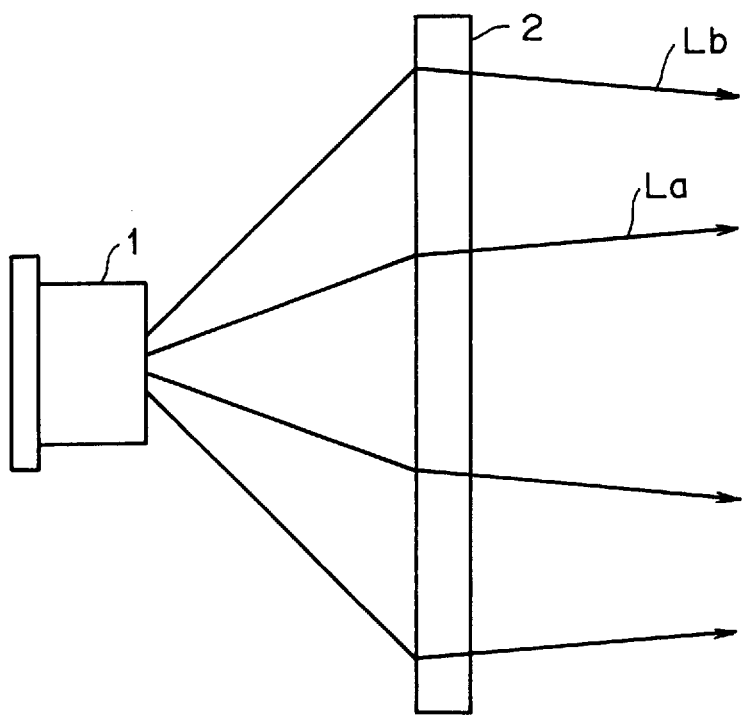
F I G. 3
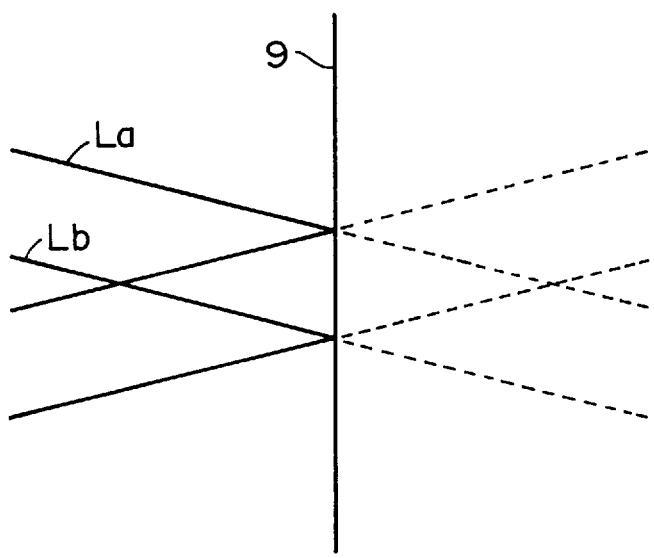

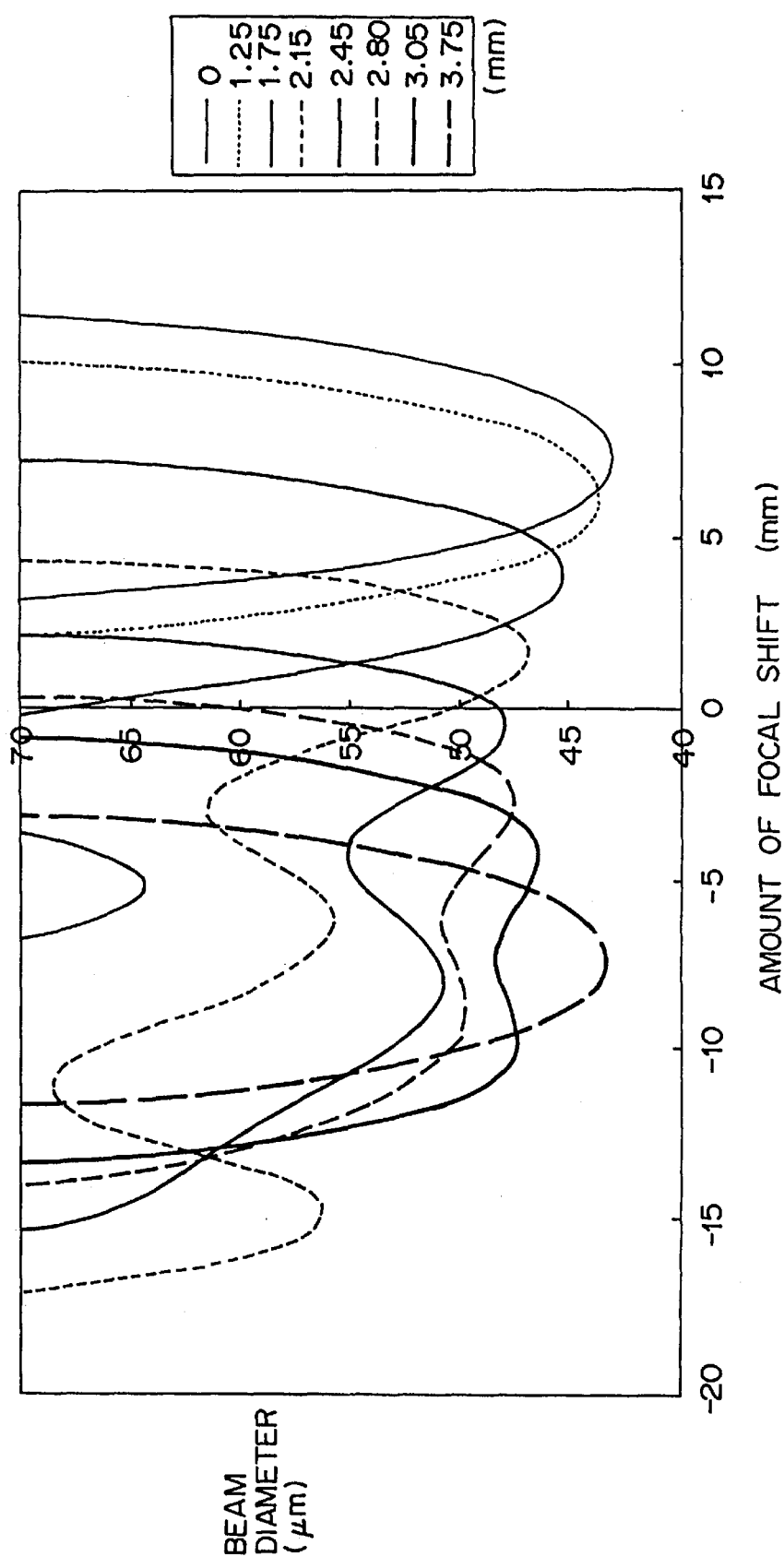
F I G. 15

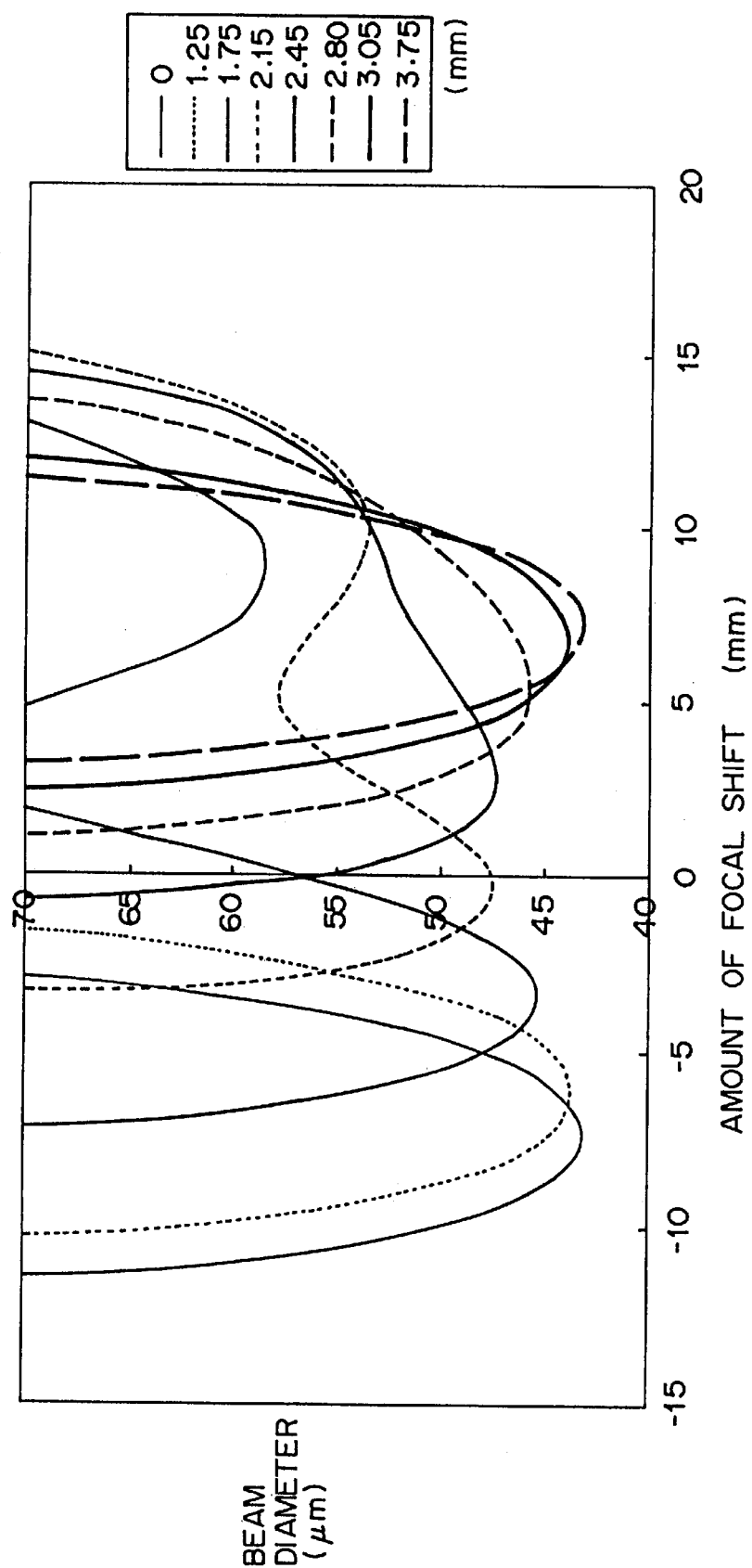
F I G. 16

F / G. 19
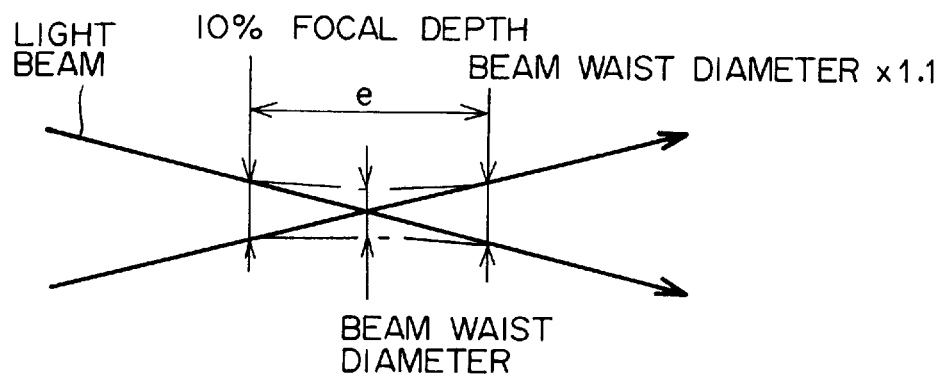
F / G. 20
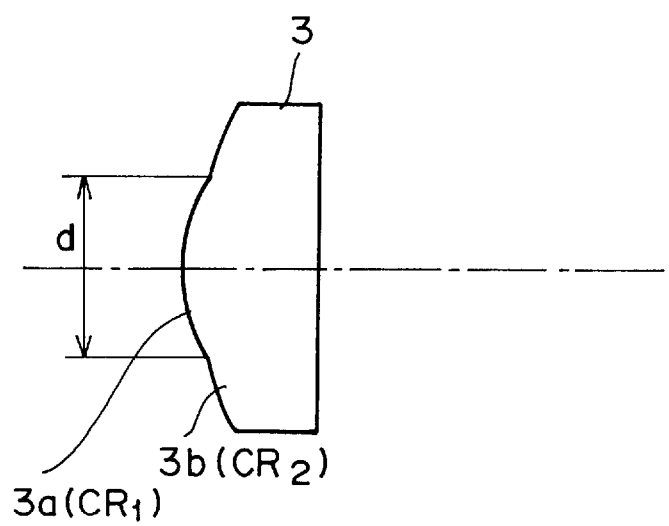

LASER BEAM SCANNING OPTICAL APPARATUS

BACKGROUND OF THE INVENTION

1. Field of the Invention

The present invention relates to a laser beam scanning optical apparatus, and more particularly to a laser beam scanning optical apparatus which is employed in a laser printer, a digital copying machine or the like as means for forming an image on a photosensitive member.

2. Description of Related Art

In a laser beam scanning optical apparatus, generally, a laser beam emitted from a laser diode is converged by a monofocal collimator lens which has a single focal length and further converged by a cylindrical lens which has a power only in a sub scanning direction to be focused on reflective surfaces of a deflector. Then, the laser beam deflected by the deflector is scanned on a photosensitive member via a scanning lens.

In such an optical apparatus, with a change in temperature, the wavelength of the emitted laser beam, the distances among the lenses, the focal length of the scanning lens, etc. change, thereby causing a shift of the beam waist (a focal shift). Consequently, there is caused a problem of deterioration of the picture quality. As measures to prevent this problem, conventionally, the collimator lens is moved along the optical axis, or the changed factors are offset by each other so that a change of the beam diameter on the photosensitive member can be inhibited.

Also, the cylindrical lens which is located before the deflector has a function of correcting variations of scanning lines in pitch which are caused by errors in perpendicularity of the reflective surfaces of the deflector. Conventionally, two (a positive and a negative) cylindrical lenses are provided, and downsizing of the optical apparatus is intended by shortening the distance between the cylindrical lenses and the deflector.

In such a conventional laser beam scanning optical apparatus, in spite of these various measures, a change of the beam diameter on the photosensitive member (focal shift) caused by a change in temperature is beyond a tolerance, and a desired image forming performance cannot be attained. Recently, a high resolution is demanded for an improve in picture quality. Accordingly, the designed beam diameter on the photosensitive member is small, and the focal depth is shallow. Therefore, a focal shift caused by a change in temperature is a big problem.

Also, when two (a positive and a negative) cylindrical lenses are used for correction of errors in perpendicularity of the reflective surfaces of the deflector, the beam diameter becomes too small, and the focal depth becomes shallow. Thereby, the control becomes difficult. In order to avoid this trouble, it is possible to provide a slit immediately before the cylindrical lenses. However, the laser beam which passes through the slit loses the quantity of light, and a sub peak occurs.

SUMMARY OF THE INVENTION

An object of the present invention is to provide a laser beam scanning optical apparatus which effectively corrects a focal shift caused by a change in temperature to keep a good image forming performance.

Another object of the present invention is to provide a laser beam scanning optical apparatus with a reduced size which effectively corrects errors in perpendicularity of reflective surfaces of a deflector and does not have such problems as thinning of the laser beam and a loss of the quantity of light.

In order to attain the objects, a laser beam scanning optical apparatus comprises a laser source, a deflector for deflecting a laser beam emitted from the laser source to scan the laser beam on a scanning surface, a scanning optical element and an optical element located between the laser source and the deflector. The optical element has a first optical power to focus a part of the laser beam on a point before the scanning surface in cooperation with the scanning lens and a second optical power to focus another part of the laser beam on a point after the scanning surface in cooperation with the scanning lens.

By designing the optical element to have optical powers in a main scanning direction and in a sub scanning direction, when the focal points shift with a change in temperature, one of the focal points comes closer to the scanning surface although the other goes farther from the scanning surface. Thereby, the beam diameter on the scanning surface can be kept substantially constant, and there is no fear of deterioration of the image forming performance.

Also, by designing the optical element to have optical powers only in the sub scanning direction, when the magnification ratio in the sub scanning direction is designed small, the focal length of the optical element does not have to be long, and the beam diameter on the scanning surface does not become small. The optical element acts to correct errors in perpendicularity of reflective surfaces of the deflector. Thus, by using the optical element with different optical powers, downsizing of the optical apparatus can be attained, and thinning of the beam diameter can be avoided. Then, because thinning of the beam diameter does not occur, a slit is not necessary, and the problems of a loss of the quantity of light and of occurrence of a sub peak can be avoided.

BRIEF DESCRIPTION OF THE DRAWINGS

These and other objects and features of the present invention will be apparent from the following description with reference to the accompanying drawings, in which:

FIG. 1 is a perspective view of a laser beam scanning optical apparatus which is a first embodiment of the present invention;

FIG. 2 is an enlarged elevational view of a light source unit and a collimator lens;

FIG. 3 is an illustration of focusing of the laser beam around the surface of a photosensitive drum;

FIG. 15 is a graph which shows the relationship between the amount of a focal shift and the beam diameter on the photosensitive drum in each case of varying the position of the border between aspherical surfaces 1 and 2 when the distance between the focal point of the aspherical surface 1 and that of the aspherical surface 2 is 15 mm, the aspherical surface 1 having a larger refracting power than the aspherical surface 2;

FIG. 16 is a graph which shows the relationship between the amount of a focal shift and the beam diameter on the photosensitive drum in each case of varying the position of the border between aspherical surfaces 1 and 2 when the distance between the focal point of the aspherical surface 1 and that of the aspherical surface 2 is 15 mm, the aspherical surface 1 having a smaller refracting power than the aspherical surface 2;

FIG. 19 is an illustration of a beam waist diameter and 10% focal depth; and

FIG. 20 is an elevational view of a cylindrical lens in a second embodiment of the present invention.

DETAILED DESCRIPTION OF THE EMBODIMENTS

Figure 4:
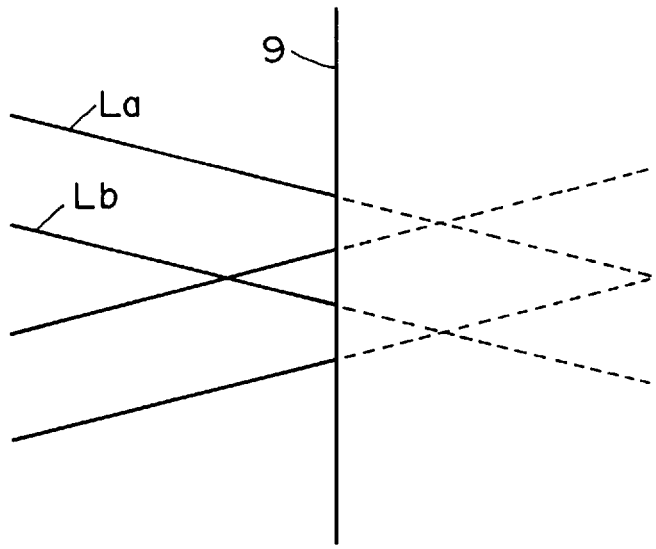
FIG. 4 is an illustration of focusing of the laser beam when the focal points shift downstream in the optical path.

Some embodiments of the present invention are described with reference to the accompanying drawings.

First Embodiment

FIG. 1 shows a laser beam scanning optical apparatus which is a first embodiment of the present invention. The laser beam scanning optical apparatus comprises a light source unit 1 with a laser diode, a collimator lens 2, a cylindrical lens 3, a polygon mirror 4, scanning lenses G1, G2 and G3, and a plane mirror 8.

The laser diode is modulated by a driver circuit (not shown) in accordance with print data and emits a laser beam with a specified wavelength. The collimator lens 2 is to change the divergent laser beam emitted from the laser diode into a substantially parallel bundle of rays. The collimator lens 2 will be described in detail later. The cylindrical lens 3 has a power only in a sub scanning direction, and the laser beam converged by the cylindrical lens 3 has a linear form extending in a main scanning direction on reflective surfaces of the polygon mirror 4.

The polygon mirror 4 has a plurality of reflective surfaces on the circumference and is driven to rotate on an axis 4a in a direction indicated by arrow "a" at a constant speed. With the rotation of the polygon mirror 4, the laser beam is deflected by the reflective surfaces of the polygon mirror 4 at a constant angular velocity. The deflected laser beam passes through the scanning lenses G1, G2 and G3 and is reflected by the plane mirror 8. Then, the laser beam is focused on a photosensitive drum 9 and is scanned in a direction of arrow "b". The scanning lenses G1, G2 and G3 mainly have a function of making the speed of main scanning, which results from deflection of the laser beam by the polygon mirror 8 at a constant angular velocity, constant, that is, a function of correcting distortion.

The photosensitive drum 9 is driven to rotate in a direction indicated by arrow "c", resulting in sub scanning of the laser beam. By the main scanning in the direction of arrow "b" and the sub scanning in the direction of arrow "c", an electrostatic latent image is formed on the photosensitive drum 9.

FIG. 2 shows the light source unit 1 and the collimator lens 2. The collimator lens 2 is a bifocal lens which has two different focal lengths in the central portion and in the peripheral portion. In rays of the laser beam emitted from the light source unit 1, those which are incident to the central portion of the collimator lens 2 are changed into a slightly divergent bundle of rays La, and those which are incident to the peripheral portion of the collimator lens 2 are changed into a slightly convergent bundle of rays Lb.

Originally, a collimator lens means a lens which changes a bundle of rays into a parallel bundle of rays. In the first embodiment, the collimator lens 2 does not change the laser beam into a parallel bundle of rays. However, since the lens 2 is the counterpart of a collimator lens in a conventional scanning optical apparatus, the lens 2 is referred to as collimator lens for convenience sake. A collimator lens of a second embodiment which will be described later has the original function.

Figure 5:
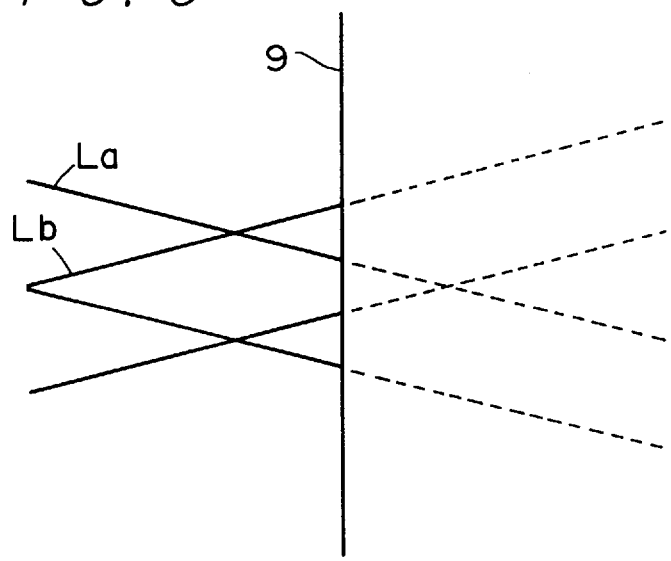
FIG. 5 is an illustration of focusing of the laser beam when the focal points shift upstream in the optical path.

FIG. 3 shows focusing of the laser beam around the photosensitive drum 9. The divergent bundle of rays La is focused on a point after the surface of the photosensitive drum 9, and the convergent bundle of rays Lb is focused on a point before the surface of the photosensitive drum 9. It is well known that in such an optical system, the focus shifts (the focal length of the whole optical system changes) with a change in temperature. FIG. 4 shows focusing of the laser beam when the focal length of the optical apparatus becomes longer. In this case, although the beam diameter of the divergent bundle of rays La on the surface of the photosensitive drum 9 becomes larger, that of the convergent bundle of rays Lb becomes smaller. FIG. 5 shows focusing of the laser beam when the focal length becomes shorter. In this case, although the beam diameter of the convergent bundle of rays Lb on the surface of the photosensitive drum 9 becomes larger, that of the divergent bundle of rays La becomes smaller.

Thus, because the collimator lens 2 is a bifocal lens, even if the focal length of the whole optical system changes with a change in temperature, either one of the bundles of rays is focused closer to the surface of the photosensitive drum 9, and thereby, enlargement of the beam diameter on the surface of the photosensitive drum 9 can be inhibited.

According to the description above, the collimator lens 2 has a larger refractive power in the central portion than in the peripheral portion. However, even if the collimator lens 2 has reversed refractive powers, the same effect can be obtained. Further, the collimator lens 2 may be a multifocal lens which has two or more different focal lengths. The following methods are possible to make the collimator lens 2 as a multifocal lens. An anisotropic crystal is used for the collimator lens 2 so as to have refractive powers varying in accordance with deflection directions. A multibeam type light source which emits a plurality of laser beams which vary in wavelength is used, and a material which causes dispersion (of which refractive power changes depending on the wavelength of the laser beam) is used for the collimator lens 2. A lens which has a diffraction surface which has a fixed pitch in a portion from the optical axis to a specified height and another fixed pitch from the height is used as the collimator lens 2. If a multibeam type light source is used in combination with such a lens with a diffraction surface, the diffraction surface does not have to have different pitches because a diffraction surface with even a fixed pitch can cause dispersion. (The diffraction power changes depending on the wavelength of the laser beam.)

Next, the construction of the first embodiment is described referring to specific values.

Tables 1 and 2 show the fundamental construction data before and after the polygon mirror respectively. Table 3 shows data about the polygon mirror, and Table 4 shows data about a cylinder surface of the cylindrical lens. The expression (1) is to define an extended toric surface of the scanning lens G3, and further, Table 5 shows data about the aspherical surface coefficient of the extended toric surface.

TABLE 1

Construction Data
Before Polygon Mirror (The vertex of the first surface of the collimator lens is the origin of the coordinate system.)

| Name | | Radius of Curvature (CR) | Coordinates of Surface Vertex (mm) | | | Distance between Surfaces (mm) | Refractive Index |
|---|---|---|---|---|---|---|---|
| | | | X | Y | Z | | |
| Light Emitting Point | — | — | −12.2 | 0 | 0 | | |
| | | | | | | 12.2 | |
| Bifocal Collimator Lens | 1 | INF | 0 | 0 | 0 | | |
| | | | | | | 5 | 1.78571 |
| | 2 | Composite A-spherical Surface | 5 | 0 | 0 | | |
| | | | | | | 45 | |
| Cylindrical Lens | 3 | Cylinder Surface | 50 | 0 | 0 | | |
| | | | | | | 5 | 1.51118 |
| | 4 | INF | 55 | 0 | 0 | | |
| | | | | | | 250 | |
| Origin of Scanning System | — | — | 305 | 0 | 0 | | |

TABLE 2

Construction Data
After Polygon Mirror

| Name | | Radius of Curvature (CR) | Coordinates of Surface Vertex (mm) | | | Distance between Surfaces (mm) | Refractive Index |
|---|---|---|---|---|---|---|---|
| | | | X | Y | Z | | |
| Origin of Scanning System | — | — | 0 | 0 | 0 | | |
| | | | | | | 33 | |
| Scanning Lens G1 | 1 | −254.411 | 33 | 0 | 0 | | |
| | | | | | | 7 | 1.51118 |
| | 2 | 1098.901 | 40 | 0 | 0 | | |
| | | | | | | 30.44 | |

TABLE 2-continued

Construction Data
After Polygon Mirror

| Name | | Radius of Curvature (CR) | Coordinates of Surface Vertex (mm) | | | Distance between Surfaces (mm) | Refractive Index |
|---|---|---|---|---|---|---|---|
| | | | X | Y | Z | | |
| Scanning Lens G2 | 3 | INF | 70.44 | 0 | 0 | | |
| | | | | | | 15 | 1.82489 |
| | 4 | −147.454 | 85.44 | 0 | 0 | | |
| | | | | | | 164 | |
| Scanning Lens G3 | 5 | Extended Toric Surface | 249.44 | −1.5 | 0 | | |
| | | | | | | 5 | 1.48457 |
| | 6 | INF | 254.44 | −1.5 | 0 | | |
| | | | | | | 131.03 | |
| Surface of Photo-sensitive Drum | — | — | 384.47 | 0 | 0 | | |

TABLE 3

Data about Polygon Mirror

| Item | | Value | |
|---|---|---|---|
| Polygon Mirror | Diameter of Inscribed Circle | | 53 mm |
| | Coordinates of the Center | X | −23.611 |
| | | Y | 12.031 |
| | Number of Reflective Surfaces | | 8 |
| Angle θ(see Fig. 1) | | | 60° |
| | SOI | | −29.66° |
| Deflection Angle | COI | | 1.615° |
| | EOI | | 32.89° |

SOI: start of a main scanning line
COI: center of a main scanning line
EOI: end of a main scanning line

TABLE 4

Data about Cylinder Surface

| | Main scanning Direction | Sub Scanning Direction (mm) |
|---|---|---|
| CR | INF | 129 |

Expression (1)
Extended Toric Surface $$X = \frac{cz^2}{1 + \sqrt{(1 - \epsilon c^2 Z^2)}} + (a_2 y^2 + a_4 y^4) Z^2$$

TABLE 5

| c | | 2.2426553e-2 |
|---|---|---|
| Aspherical Surface Coefficient | $\epsilon$ | 1.0 |
| | $a_2$ | −1.22e-07 |
| | $a_4$ | 1.55e-12 |

The second surface which is a composite aspherical surface of the collimator lens is defined as follows:

x=max{(aspherical surface 1), (aspherical surface 2+b)}. . . in the first and second examples x=min{(aspherical surface 1), (aspherical surface 2+b)}. . . in the third example The aspherical surfaces 1 and 2 are symmetric with each other around an axis as expressed by the following expression (2). In the expression (2), the second term defines the deviation.

$$X = \frac{cy^2}{1 + \sqrt{(1 - \epsilon c^2 y^2)}} + \sum_{i=4}^{10} a_i y^i \qquad \text{Expression (2)}$$

Next, three examples 1, 2 and 3 of the composite aspherical surface, which have different offset values b are described referring to Tables 6, 7 and 8.

TABLE 6

Example 1

| | Aspherical Surface 1 | Aspherical Surface 2 |
|---|---|---|
| c | −8.5002624e−02 | −8.4683996e−02 |
| Aspherical Surface Coefficient | $\epsilon$ 1.0<br>$a_4$ 5.0555273e−05.<br>$a_6$ 2.9446450e−07<br>$a_8$ 1.3602444e−09<br>$a_{10}$ 8.1695124e−12 | $\epsilon$ 1.0<br>$a_4$ 4.9947628e−05<br>$a_6$ 2.8959189e−07<br>$a_8$ 1.3293753e−09<br>$a_{10}$ 7.8349615e−12 | b = −0.0015

TABLE 7

Example 2

| | Aspherical Surface 1 | Aspherical Surface 2 |
|---|---|---|
| c | −8.4972838e−02 | −8.4718063e−02 |
| Aspherical Surface Coefficient | $\epsilon$ 1.0<br>$a_4$ 5.0498112e−05<br>$a_6$ 2.9399605e−07<br>$a_8$ 1.3579663e−09<br>$a_{10}$ 8.1224406e−12 | $\epsilon$ 1.0<br>$a_4$ 5.0012134e−05<br>$a_6$ 2.9010777e−07<br>$a_8$ 1.3327259e−09<br>$a_{10}$ 7.8682149e−12 | b = −0.001

TABLE 8

Example 3

| | Aspherical Surface 1 | Aspherical Surface 2 |
|---|---|---|
| c | −8.4718063 e−02 | −8.4972838 e−02 |
| Aspherical Surface Coefficient | $\epsilon$ 1.0<br>$a_4$ 5.0012134e−05<br>$a_6$ 2.9010777e−07<br>$a_8$ 1.3327259e−09<br>$a_{10}$ 7.8682149e−12 | $\epsilon$ 1.0<br>$a_4$ 5.0498112e−05<br>$a_6$ 2.9399605e−07<br>$a_8$ 1.3579663e−09<br>$a_{10}$ 8.1224406e−12 | b = 0.0006

Next, the result of computer simulation using the above construction data is described.

Figure 6:
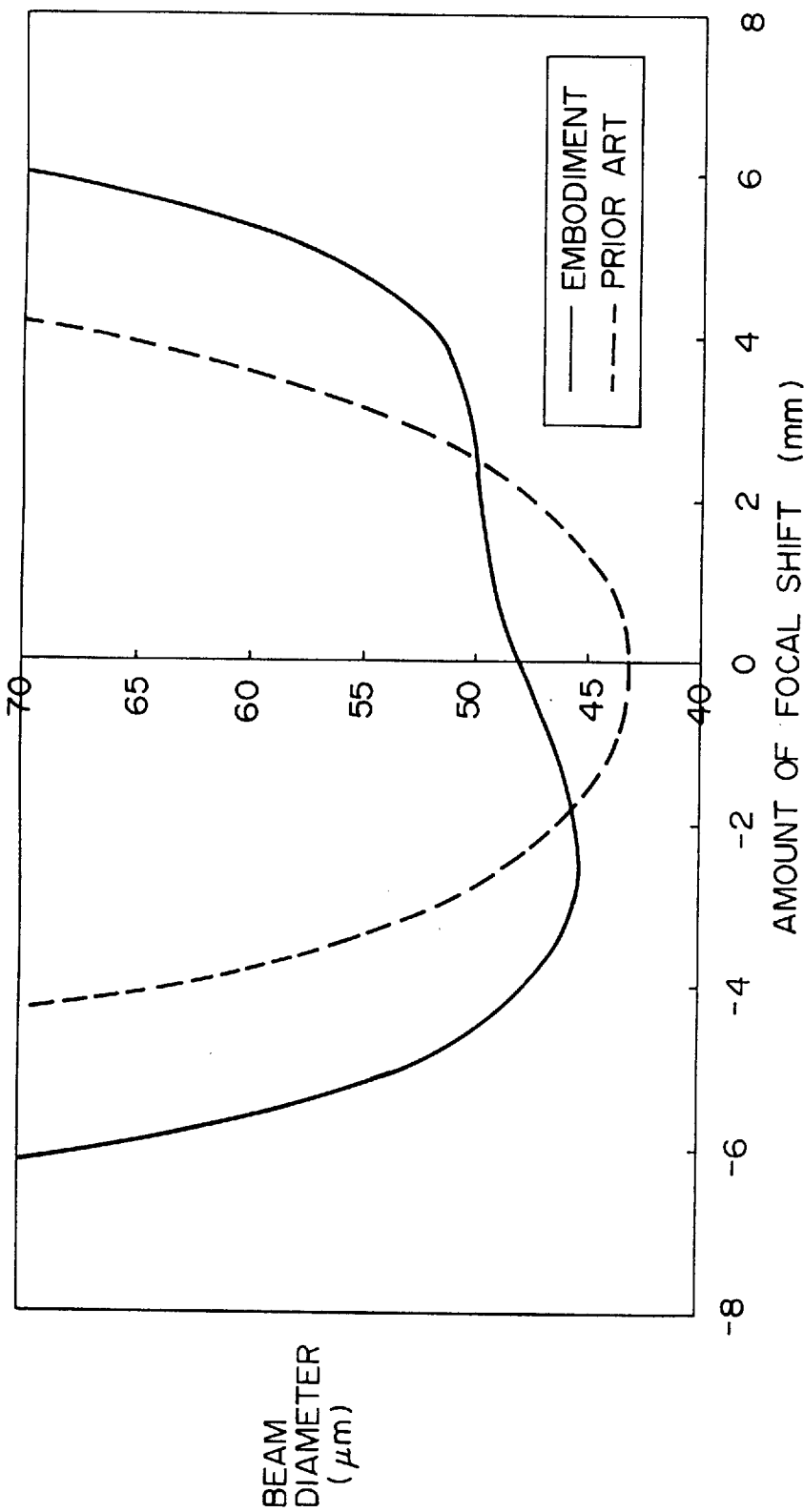
FIG. 6 is a graph which shows the relationship between the amount of a focal shift and the beam diameter on the photosensitive drum in an example 1.
Figure 9:
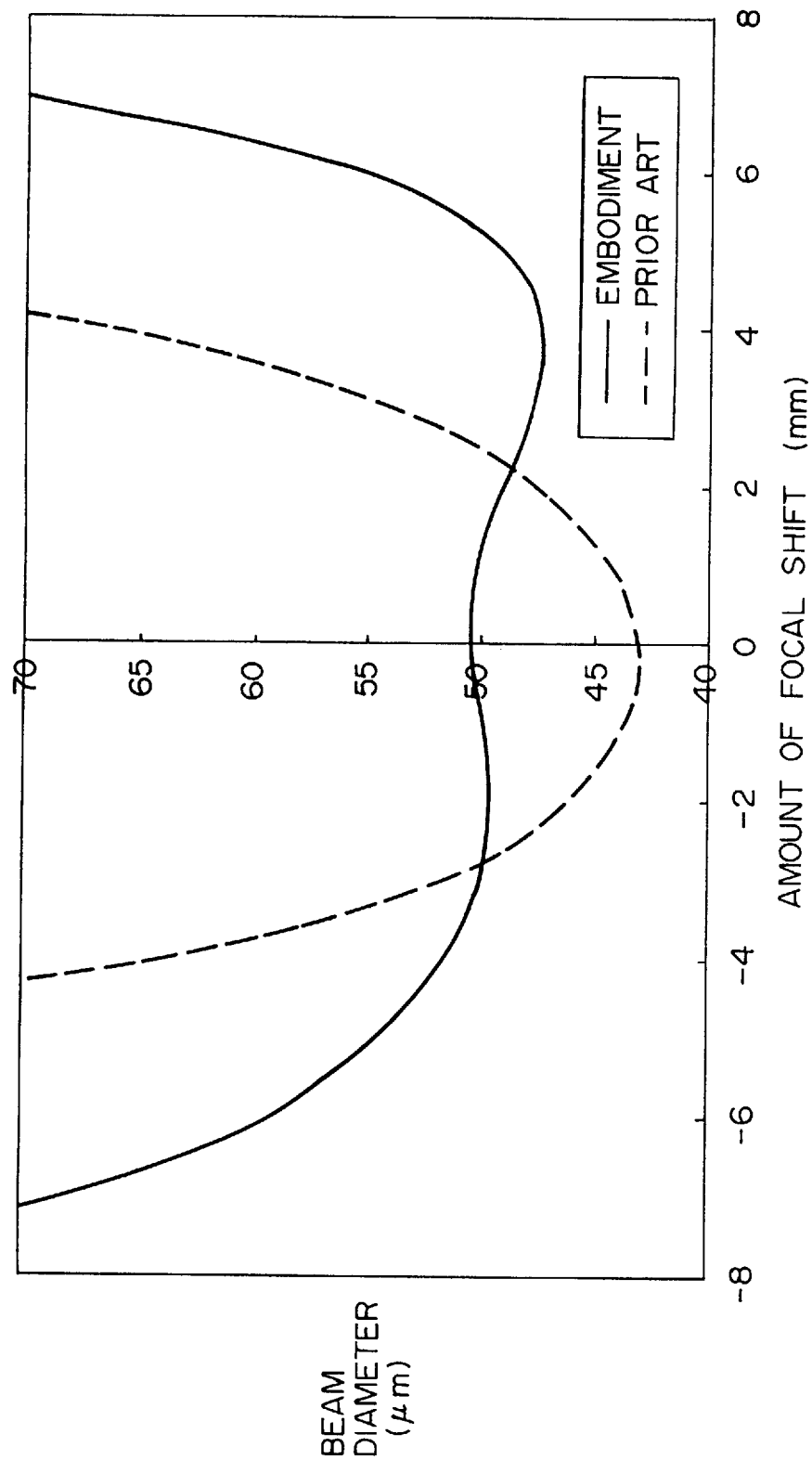
FIG. 9 is a graph which shows the relationship between the amount of a focal shift and the beam diameter on the photosensitive drum in an example 2.
Figure 12:
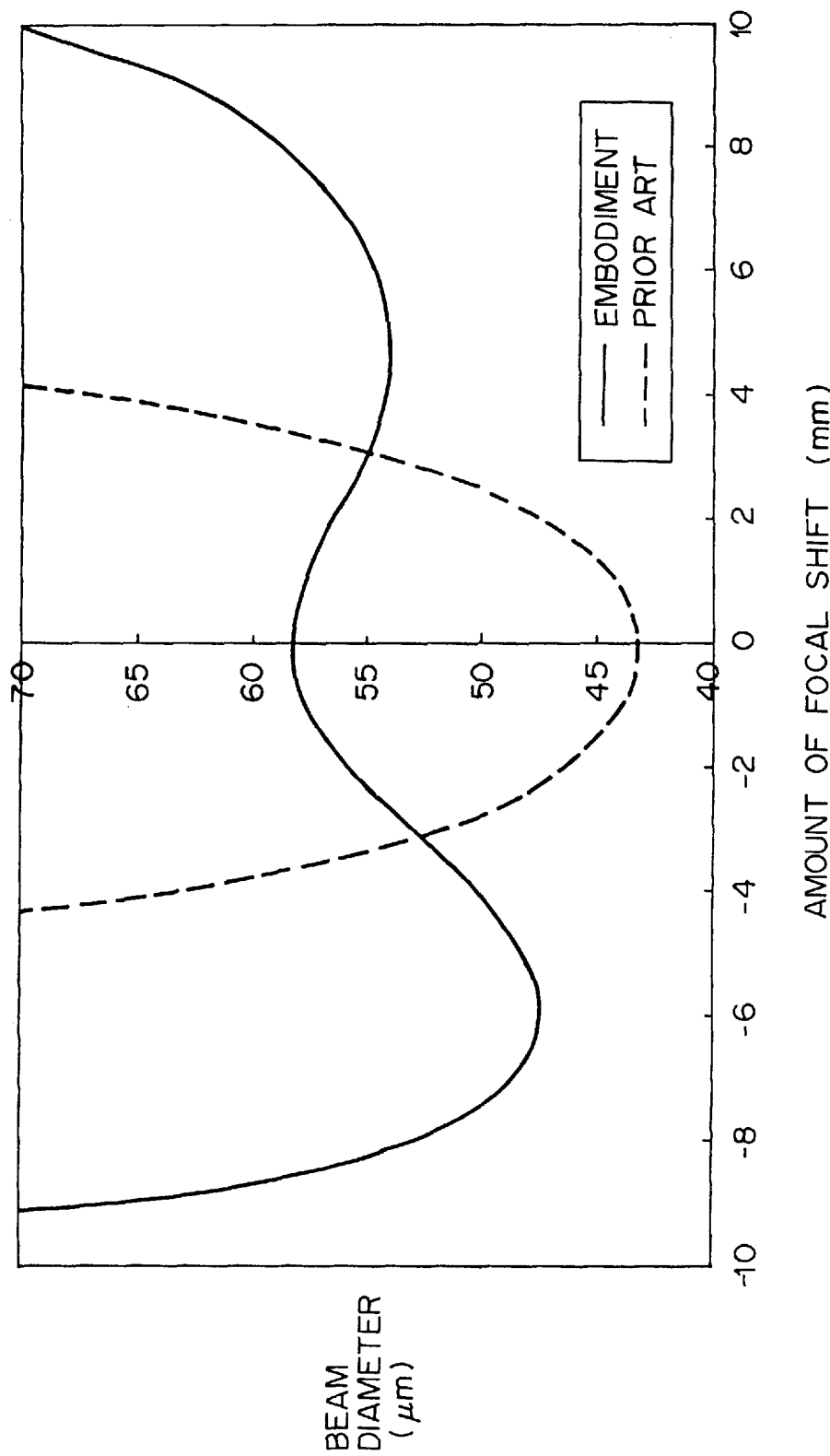
FIG. 12 is a graph which shows the relationship between the amount of a focal shift and the beam diameter on the photosensitive drum in an example 3.

FIGS. 6, 9 and 12 show the change of the beam diameter on the photosensitive drum caused by focal shifts in each of the examples 1, 2 and 3. As is apparent from FIGS. 6, 9 and 12, the focal depth of each of the examples 1, 2 and 3 is deeper than that of a conventional case. The beam diameter means the half-width in the main scanning direction of a beam for one dot.

Figure 7:
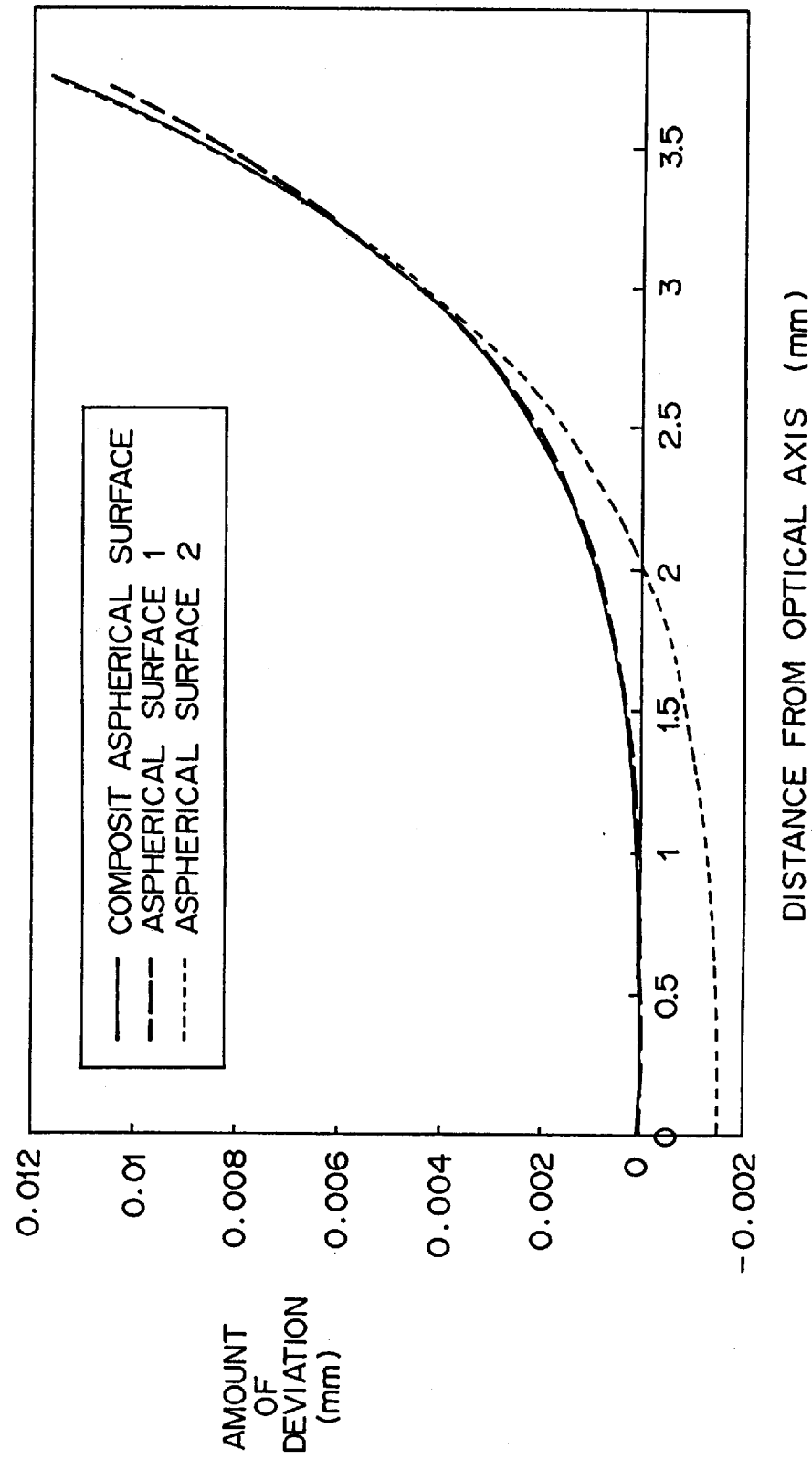
FIG. 7 is a graph which shows the shape of a composite aspherical surface in the example 1.
Figure 10:
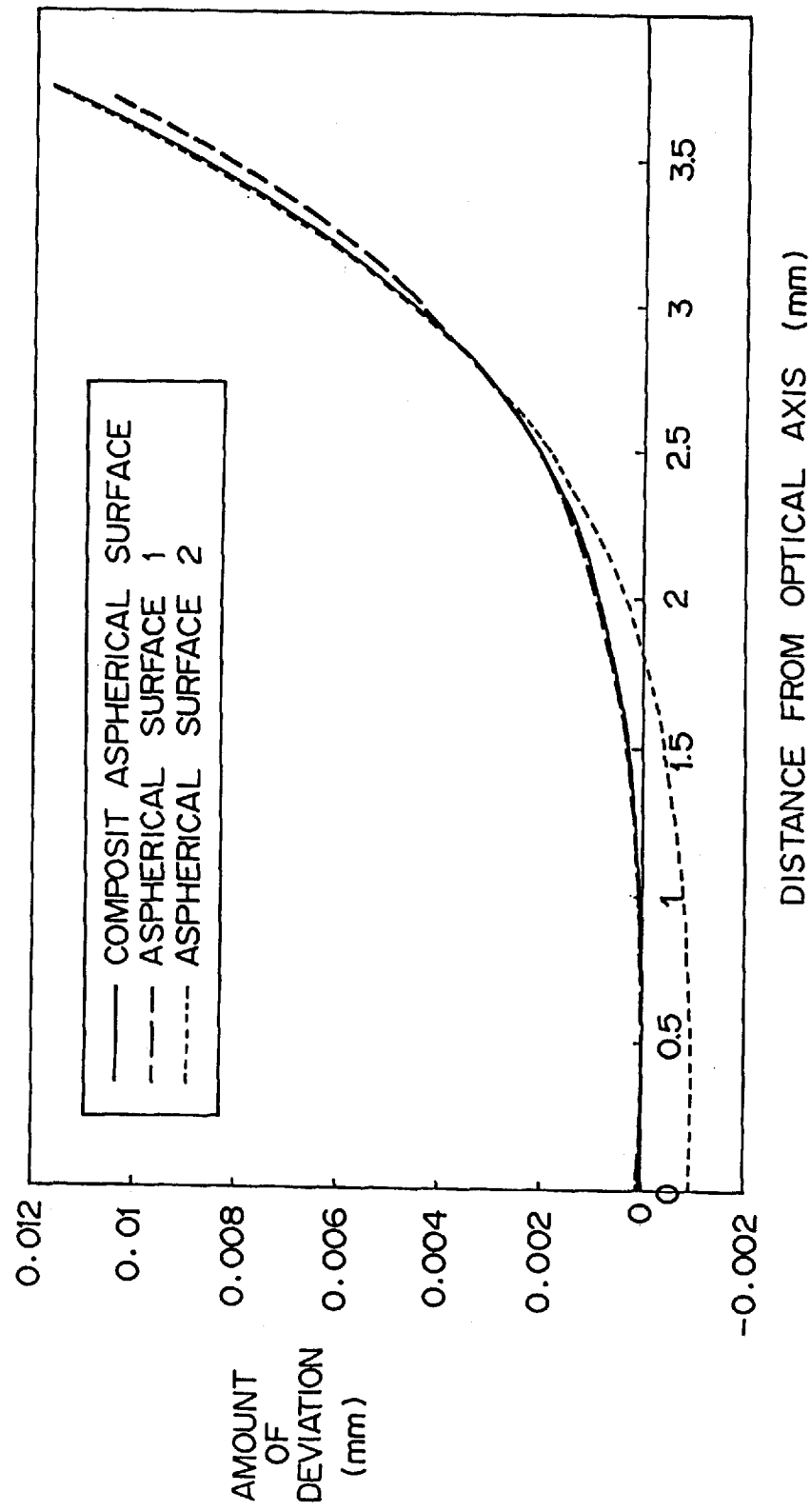
FIG. 10 is a graph which shows the shape of a composite aspherical surface in the example 2.
Figure 13:
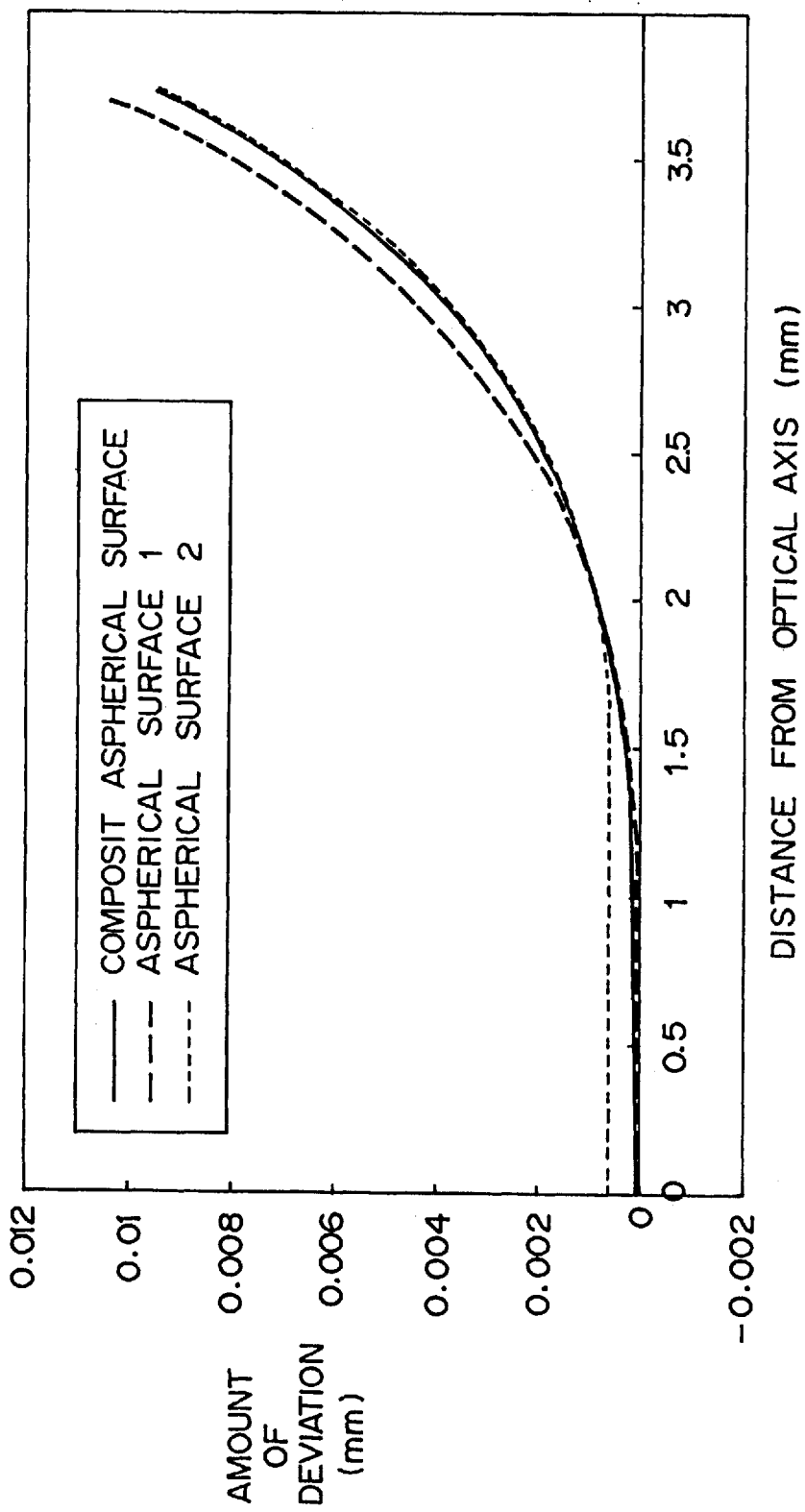
FIG. 13 is a graph which shows the shape of a composite aspherical surface in the example 3.

FIGS. 7, 10 and 13 show the configuration of the composite aspherical surface of the collimator lens, and more specifically the amount of deviation from a basic spherical surface, in each of the examples 1, 2 and 3. In each of the examples 1, 2 and 3, the composite aspherical surface is almost similar to the aspherical surface 1 in a central portion near the optical axis and is almost similar to the aspherical surface 2 in a peripheral portion far from the optical axis.

Figure 8:
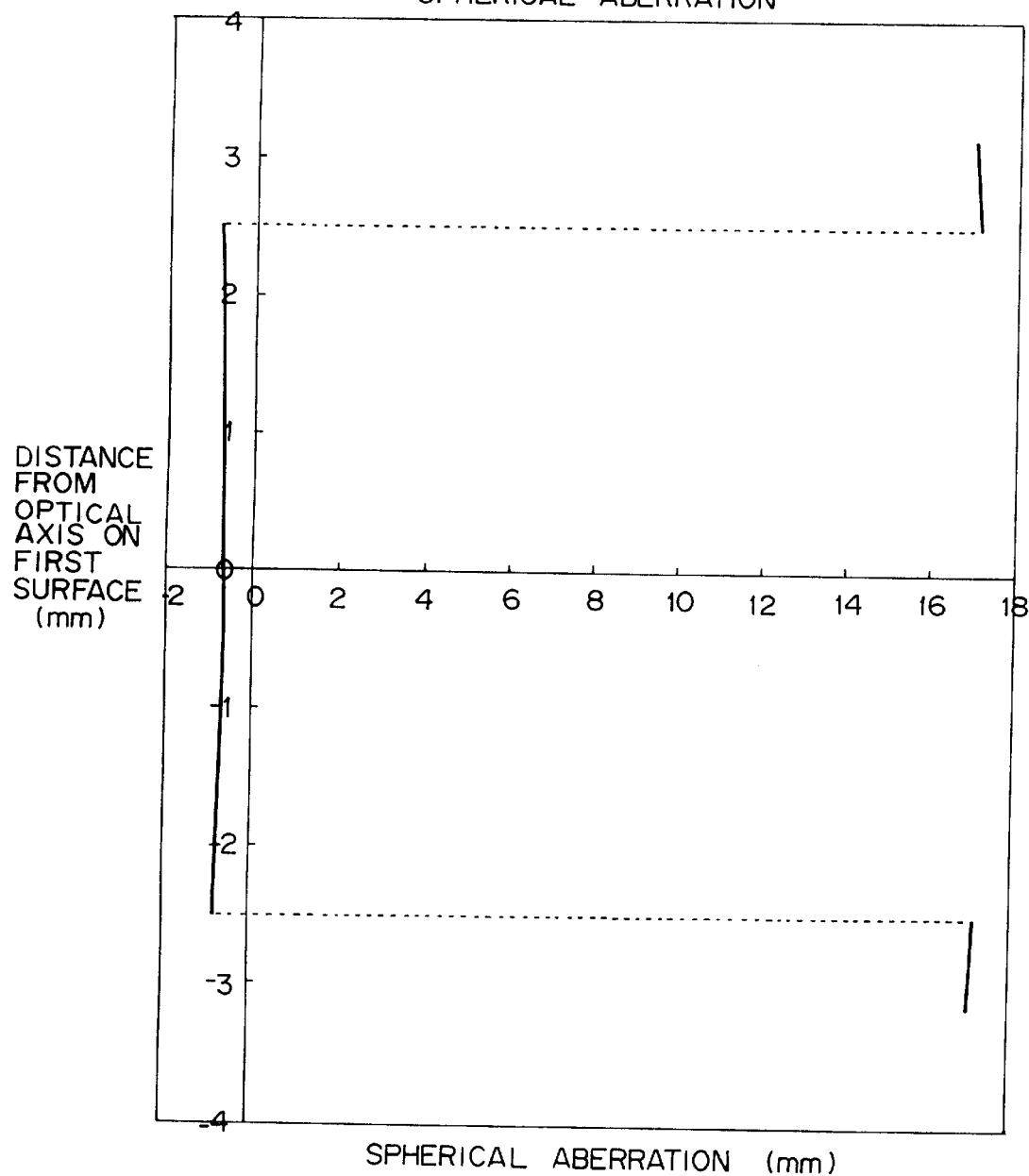
FIG. 8 is a graph which shows the spherical aberration in the example 1.
Figure 11:
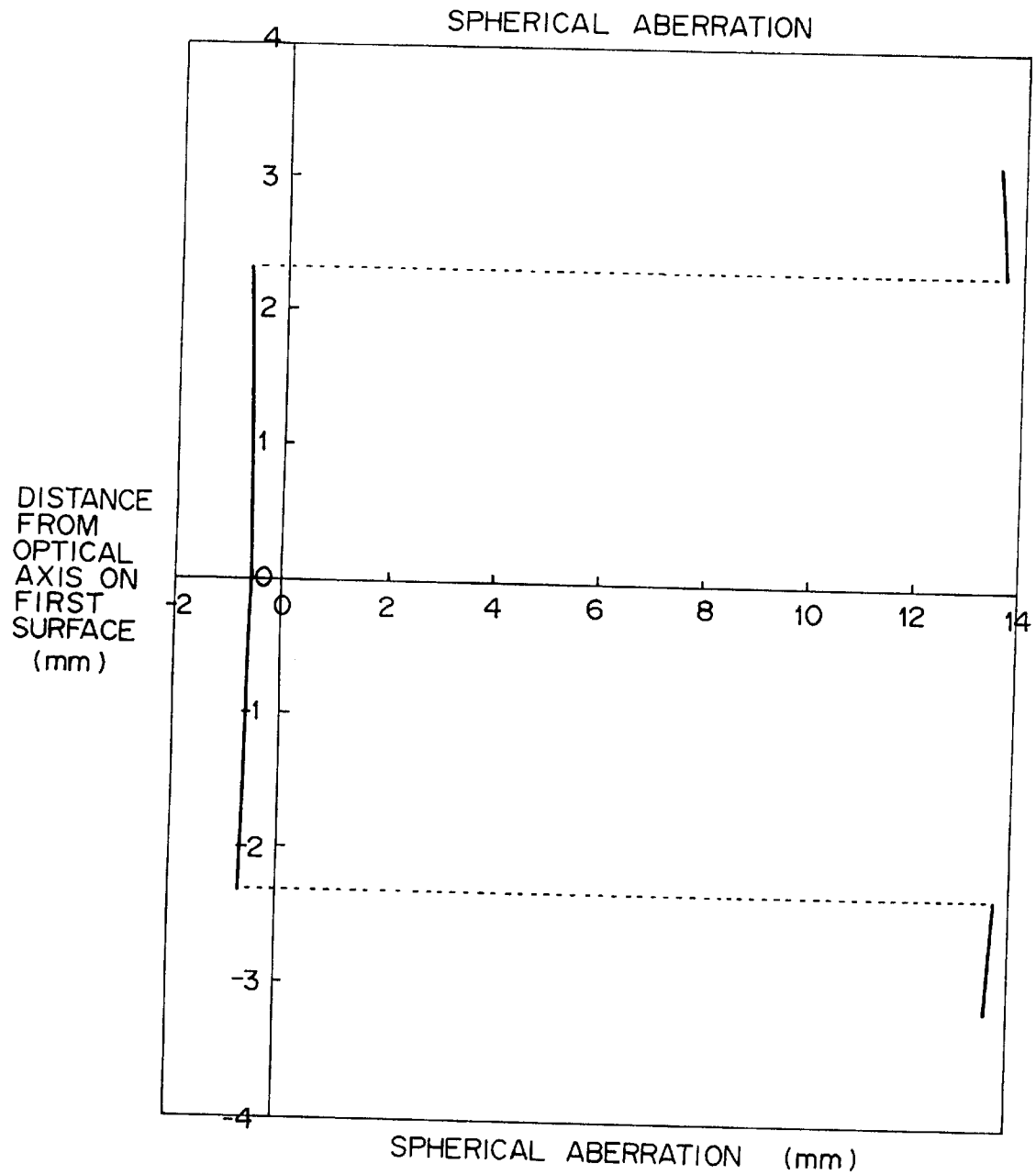
FIG. 11 is a graph which shows the spherical aberration in the example 2.
Figure 14:
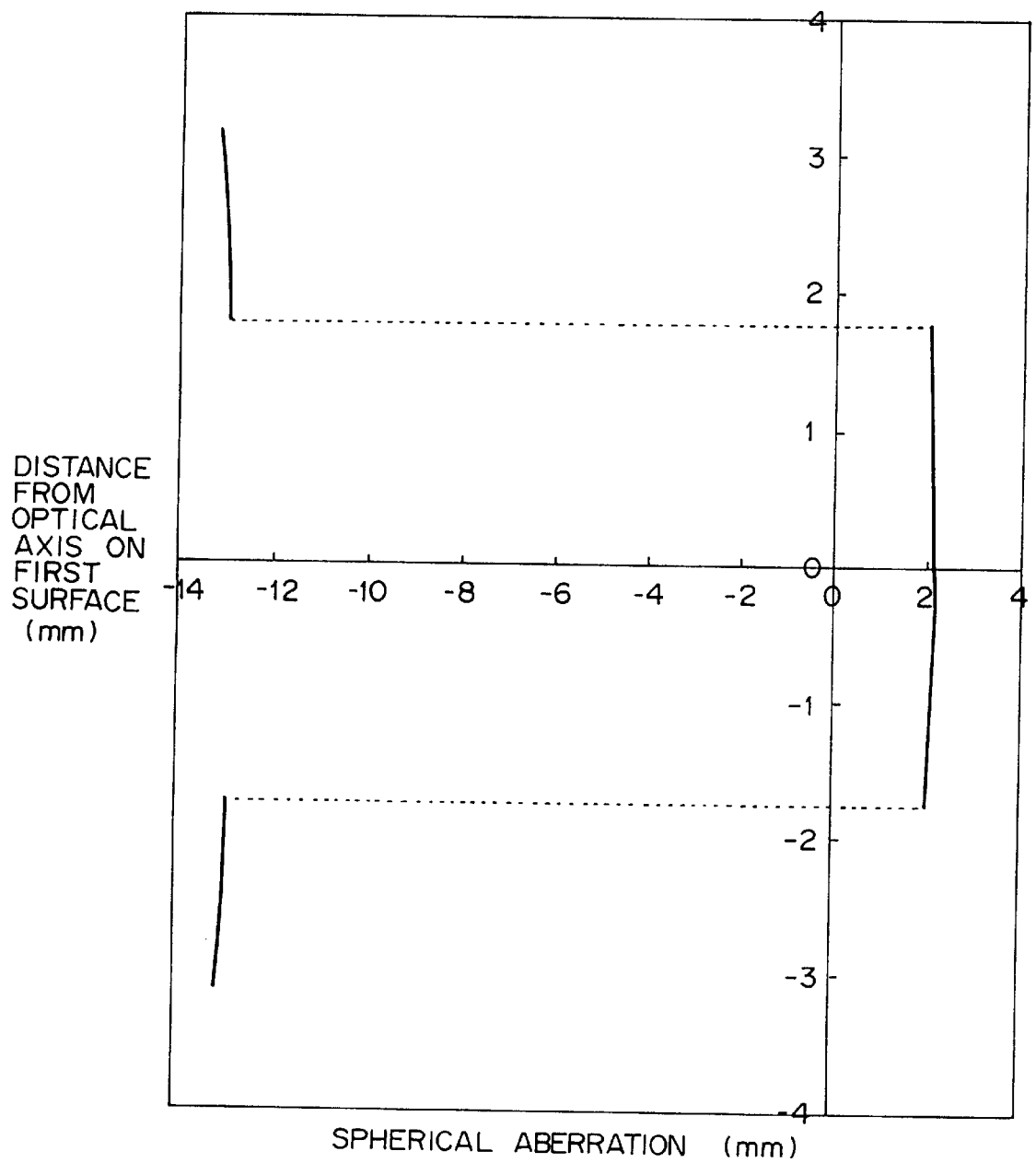
FIG. 14 is a graph which shows the spherical aberration in the example 3.

FIGS. 8, 11 and 14 show the spherical aberration on COI (the center of a main scanning line) in each of the examples 1, 2 and 3. Since the spherical aberration totally changes depending on whether the laser beam has passed through the portion of the aspherical surface 1 or the portion of the aspherical surface 2, the spherical aberration characteristic is not continuous and is shown by substantially linear sections. One of the spherical aberration by the portion of the aspherical surface 1 and that by the portion of the aspherical surface 2 is positive, and the other is negative. The spherical aberration by the portion of the aspherical surface 1 or the aspherical surface 2 which includes the optical axis is closer to "0".

FIG. 15 through 18 show the change of the beam diameter on the photosensitive drum caused by focal shifts in each case of varying the offset value b of the composite aspherical surface to change the position of the border between the aspherical surfaces 1 and 2. Each of the values recited in FIGS. 15 through 18 as examples indicates the distance between the optical axis and the position of the border. The value "3.75" indicates that the whole area of the surface is the aspherical surface 1, and the value "0" indicates that the whole area of the surface is the aspherical surface 2. Intermediate values between these values indicate that the surface is a composite aspherical surface.

FIGS. 15 and 16 show the characteristics when the distance between the focal point of the aspherical surface 1 and the focal point of the aspherical surface 2 is approximately 15 mm. The examples 2 and 3 come under this case (see FIGS. 11 and 14).

FIG. 15 shows a case of a composite aspherical surface of which central portion (around the optical axis) has a focal point in a minus side and of which peripheral portion has a focal point in a plus side. The example 2 comes under this case (see FIGS. 10 and 11). In the example 2, the position of the border is "2.80", and the distance between the light emitting point and the first surface is minutely controlled. In FIG. 15, the distance between the light emitting point and the first surface is fixed, so that the relationship between the position of the border and the beam diameter on the photosensitive drum is apparent. Here, the center of a region in which the beam diameter is not more than a certain value is referred to as "center of depth". The center of depth of a composite aspherical surface is located between that of the aspherical surface 1 and that of the aspherical surface 2. The farther the border is located from the optical axis, the farther the center of depth moves in the minus direction. Also, when the position of the border is closer to the optical axis than to the edge of the lens (here, the position of the border is indicated by a value within a range from 0 to 1.875), effective improvement in focal depth cannot be expected.

FIG. 16 shows a reverse case of FIG. 15. FIG. 16 shows a case of a composite aspherical surface of which central portion (around the optical axis) has a focal point in a plus side and of which peripheral portion has a focal point in a minus side. The example 3 comes under this case (see FIGS. 13 and 14). In the example 3, the position of the border is "2.15", and the distance between the light emitting point and the first surface is minutely controlled. The case of FIG. 16 has similar characteristics to the case of FIG. 15 although the plus/minus directions along the x-axis are reversed.

Figure 17:
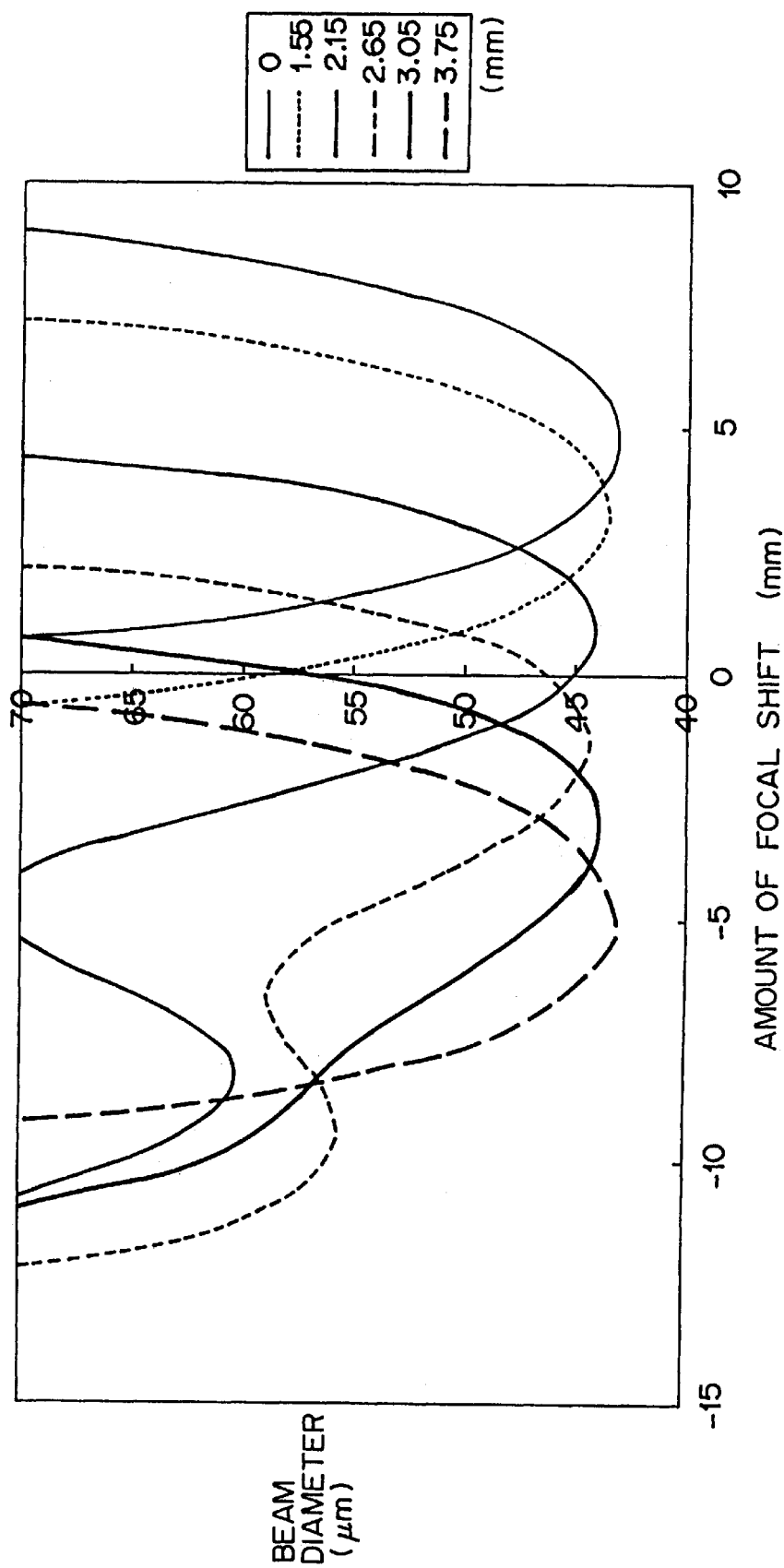
FIG. 17 is a graph which shows the relationship between the amount of a focal shift and the beam diameter on the photosensitive drum in each case of varying the position of the border between aspherical surfaces 1 and 2 when the distance between the focal point of the aspherical surface 1 and that of the aspherical surface 2 is 10 mm, the aspherical surface 1 having a larger refracting power than the aspherical surface 2.
Figure 18:
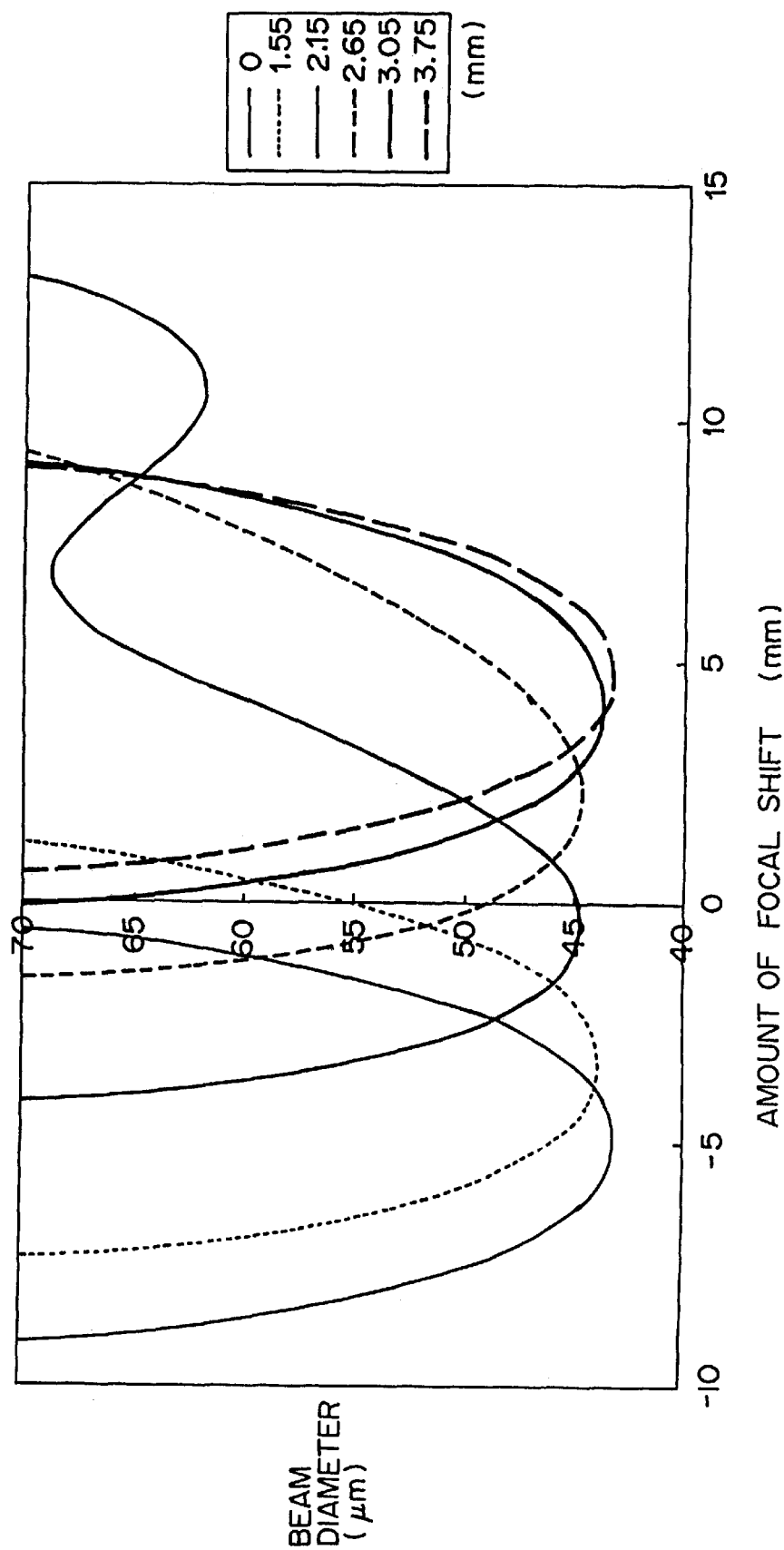
FIG. 18 is a graph which shows the relationship between the amount of a focal shift and the beam diameter on the photosensitive drum in each case of varying the position of the border between aspherical surfaces 1 and 2 when the distance between the focal point of the aspherical surface 1 and that of the aspherical surface 2 is 10mm, the aspherical surface 1 having a smaller refracting power than the aspherical surface 2.

FIGS. 17 and 18 show the characteristics when the distance between the focal point of the aspherical surface 1 and the focal point of the aspherical surface 2 is approximately 10 mm. In these cases, effective improvement in focal depth can hardly be expected. It seems that the distance between the focal points is too small.

From the study above, a composite aspherical surface which is used to obtain a sufficient focal depth must fulfill the following conditions.

1/2≦C/R<1 d>2e

C: position of the border between the aspherical surfaces 1 and 2

R: radius of a region in which the laser beam passes through d: distance between the focal point of the aspherical surface 1 and that of the aspherical surface 2 e: length of a range in which the beam diameter is not more than (beam waist diameter×1.1), that is, 10% focal depth when a monofocal lens is used (see FIG. 19)

Second Embodiment

Next, a laser beam scanning optical apparatus which is a second embodiment of the present invention is described. The second embodiment has basically the same structure as the first embodiment shown by FIG. 1. The difference is that the cylindrical lens 3 not the collimator lens 2 is a bifocal lens. The cylindrical lens 3 has powers only in the sub scanning direction and has different focal lengths in the central portion and in the peripheral portion with respect to the sub scanning direction.

First, a case in which the cylindrical lens 3 is a monofocal lens is studied.

The beam diameter on the photosensitive drum in the sub scanning direction is expressed by the following expression (3).

$$W = \beta \cdot 4\lambda f_{cy}/\pi d \quad (3)$$

W: beam diameter on the photosensitive drum in the sub scanning direction

β: magnification ratio in the sub scanning direction $f_{cy}$: focal length of the cylindrical lens d: beam diameter in the sub scanning direction of an incident beam to the cylindrical lens λ: wavelength of the beam For example, when $f_{cy}$=101.2 mm, β=2, d=3.65 mm and λ=780 nm, the beam diameter W on the photosensitive drum is approximately 55 μm. Then, when the magnification ratio β is made half for more effective correction of errors in perpendicularity of the reflective surfaces of the polygon mirror, the beam diameter W on the photosensitive drum becomes 27.5 μm.

The relationship between the beam diameter on the photosensitive drum and the amount of a focal shift is expressed by the following expression (4).

$$D = D_o \sqrt{1 + (4\lambda x/\pi D_o^2)^2} \quad (4)$$

$D_o$: beam waist diameter

D: beam diameter on the photosensitive drum when the focus shifts by a distance x occurs x: amount of a focal shift λ: wavelength of the beam When the beam waist diameter $D_o$ with $1/e^2$ is 55 μm, the 10% focal depth is approximately +/−1.15 mm. However, when the beam waist diameter $D_o$ is 27.5 μm, the 10% focal depth is approximately +/−0.35 mm, and this is very difficult of practical use.

Therefore, conventionally, even when the magnification ratio in the sub scanning direction β is made small for more effective correction of errors in perpendicularity of the reflective surfaces of the polygon mirror, the beam diameter W is intended to be fixed. According to the above expression (3), in order to obtain a fixed beam diameter W, when the magnification ratio in the sub scanning direction β is made small, the focal length of the cylindrical lens $f_{cy}$ must be lengthened in inverse proportion to the magnification ratio β. Accordingly, conventionally, a way of lengthening the focal length of the cylindrical lens has been adopted. More specifically, when the magnification ratio in the sub scanning direction β is made half, the focal length of the cylindrical lens $f_{cy}$ is made double. However, lengthening the focal length $f_{cy}$ increases the size of the optical apparatus and enlarges minute errors of the cylindrical lens and the scanning lenses, thereby making correction of the errors very difficult.

In order to solve the problem, in the second embodiment, a bifocal lens is used as the cylindrical lens 3. As FIG. 20 shows, the cylindrical lens 3 has a central portion 3a with a radius of curvature $CR_1$ in a region corresponding to the beam diameter of the incident beam d and a peripheral portion 3b with a radius of curvature $CR_2$. The values d, $CR_1$ and $CR_2$ can be set arbitrarily, and the cylindrical lens 3 can be not only a convex lens but also a concave lens and a convex/concave combination. Also, as mentioned in connection with the collimator lens 2 of the first embodiment, the cylindrical lens 3 can be a multifocal lens, and an anisotropic crystal, a multibeam type light source and a diffraction surface can be used.

Next, the effect of using a bifocal lens as the cylindrical lens 3 is described referring to specific values. When a monofocal cylindrical lens with a focal length $f_{cy}$ of 252 mm is used, if the magnification ratio in the sub scanning direction β is 0.75 and if the beam diameter d of the incident beam is 3.65 mm, the beam diameter W on the photosensitive drum is approximately 50 μm, and the 10% focal depth is approximately +/−1.15 mm. On the other hand, when a bifocal cylindrical lens is used, if the radius of curvature $CR_1$ of the central portion 3a is 60 mm (the focal length is 117.3 mm), the radius of curvature $CR_2$ of the peripheral portion should be set as shown in Table 9. Table 9 also shows the beam diameter d of the incident beam and the 10% focal depth.

TABLE 9

| | $CR_1$ | $CR_2$ | d | Focal Depth |
|---|---|---|---|---|
| (1) | 60 | 65 | 1 | +/−1.6 |
| (2) | 60 | 63 | 1.3 | +/−1.2 |
| (3) | 60 | 70 | 1 | +/−1.6 | unit: mm

It is preferred that there is a relationship expressed by the following expression between the radius of curvature $CR_1$ and the radius of curvature $CR_2$.

$$1.03 < CR_2/CR_1 < 1.2$$

Other Embodiments

In the embodiments above, the scanning lenses G1, G2 and G3 form a scanning system. However, the construction of the scanning system can be arbitrarily designed. For example, a mirror with an fθ function can be used.

Although the present invention has been described in connection with the preferred embodiments above, it is to be noted that various changes and modifications are possible to those who are skilled in the art. Such changes and modifications are to be noted as being within the scope of the invention.

What is claimed is:

1. A scanning optical apparatus comprising:

a laser source;

a deflector for deflecting a laser beam emitted from the laser source to scan the laser beam on a scanning surface;

a scanning optical element; and an optical element which is located between the laser source and the deflector, the optical element having a first optical power to focus a part of the laser beam on a point before the scanning surface in cooperation with the scanning optical element and a second optical power to focus another part of the laser beam on a point after the scanning surface in cooperation with the scanning optical element.

2. A scanning optical apparatus as claimed in claim 1, wherein the optical element has optical powers in a main scanning direction and in a sub scanning direction.

3. A scanning optical apparatus as claimed in claim 1, wherein the optical element has optical powers only in a sub scanning direction.

4. A scanning optical apparatus as claimed in claim 1, wherein the optical element makes a part of the laser beam emergent therefrom as a divergent bundle of rays and makes another part of the laser beam emergent therefrom as a convergent bundle of rays.

5. A scanning optical apparatus as claimed in claim 1, wherein the optical element is a multifocal lens which has refractive powers varying from portion to portion in accordance with a height of the portion from an optical axis.

6. A scanning optical apparatus as claimed in claim 5, wherein the multifocal lens is a composite aspherical lens which has a central portion shaped into an aspherical surface near the optical axis and has a peripheral portion shaped into another aspherical surface.

7. A scanning optical apparatus as claimed in claim 6, wherein when the shape of the central portion of the multifocal lens is referred to as aspherical surface 1 and when the shape of the peripheral portion of the multifocal lens is referred to as aspherical surface 2, the multifocal lens fulfills the following conditions:

$1/2 \leq C/R < 1$ $d > 2e$ wherein, C is a distance between the optical axis and a border of the aspherical surface 1 and the aspherical surface 2, R is a radius of a region in which the laser beam passes through, d is a distance between a focal length of the aspherical surface 1 and a focal length of the aspherical surface 2, and e is a length in a direction of the optical axis of a range in which the laser beam has a beam diameter not more than (beam waist diameter×1.1) when a monofocal lens is provided instead of the multifocal lens.

8. A scanning optical apparatus as claimed in claim 5, wherein the multifocal lens is a cylindrical lens which has refractive powers only in a sub scanning direction and has mutually different curvatures in a central portion and in a peripheral portion.

9. A scanning optical apparatus as claimed in claim 8, wherein the cylindrical lens fulfills the following condition:

$1.03 < CR_1/CR_2 < 1.2$ wherein, $CR_1$ is a radius of curvature of the central portion, and $CR_2$ is a radius of curvature of the peripheral portion.

10. A method of inhibiting a change in diameter of a beam spot on a scanning surface with a change in temperature in a scanning optical apparatus which deflects a laser beam emitted from a laser source with a deflector to scan the laser beam on a scanning surface and focuses the laser beam on the scanning surface with a scanning optical element, comprising the steps of:

designing an optical element which has a first and a second optical power, wherein the first optical power focuses a part of the laser beam on a point before the scanning surface in cooperation with the scanning optical element, the second optical power focuses another part of the laser beam on a point after the scanning optical surface in cooperation with the scanning optical element; and providing the optical element between the laser source and the deflector.

\* \* \* \* \*